US011979434B2

(12) United States Patent
Li et al.

(10) Patent No.: US 11,979,434 B2
(45) Date of Patent: May 7, 2024

(54) SYSTEM AND METHOD FOR SECURE MULTITENANT OPERATIONS OF A DISTRIBUTED COMPUTING CLUSTER

(71) Applicant: Northrop Grumman Systems Corporation, Falls Church, VA (US)

(72) Inventors: Leon D. Li, McLean, VA (US); Tyson Solberg, Clarence Center, NY (US); Christopher Lock, Hauppauge, NY (US); Richard Vitek, Hurst, TX (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 231 days.

(21) Appl. No.: 17/357,549

(22) Filed: Jun. 24, 2021

(65) Prior Publication Data
US 2021/0320950 A1 Oct. 14, 2021

Related U.S. Application Data

(62) Division of application No. 16/131,377, filed on Sep. 14, 2018, now Pat. No. 11,070,590.

(51) Int. Cl.
*G06F 9/451* (2018.01)
*H04L 9/40* (2022.01)

(52) U.S. Cl.
CPC .............. *H04L 63/20* (2013.01); *G06F 9/451* (2018.02); *H04L 63/0884* (2013.01); *H04L 63/101* (2013.01)

(58) Field of Classification Search
CPC ... H04L 63/20; H04L 63/0884; H04L 63/101; G06F 9/451
See application file for complete search history.

(56) References Cited

U.S. PATENT DOCUMENTS 9,130,920 B2  9/2015 Pelykh
9,628,486 B2  4/2017 Wang et al.
(Continued)

FOREIGN PATENT DOCUMENTS

WO  WO-2016077367 A1 * 5/2016 ............. G06F 9/455

OTHER PUBLICATIONS

Notice of Allowance dated Mar. 24, 2021, from U.S. Appl. No. 16/131,377, 35 sheets.
(Continued)

*Primary Examiner* — Matthew Smithers
*Assistant Examiner* — Shu Chun Gao
(74) *Attorney, Agent, or Firm* — KATTEN MUCHIN ROSENMAN LLP

(57) ABSTRACT

A system and a method for secure operator onboarding and creating an ingest job agent for secure multitenant operations of a distributed computing cluster are provided. Embodiments automate multitenant operations for distributed computing clusters. These operations include automation of operator onboarding, creation of logically segregated distributed data stores within the distributed computing clusters for the on-boarded operator, and creation of ingest agents with security isolation for transfer of large quantities of files into the distributed computing clusters. Embodiments provide multitenant security, in which the same Hadoop cluster serves multiple operators with each operator's data and processes in effective isolation. In this manner, multitenant security keeps each user's data storage and operations on the Hadoop cluster separated from other operators.

10 Claims, 19 Drawing Sheets

(56) References Cited

U.S. PATENT DOCUMENTS

| | | | |
|---|---|---|---|
| 9,774,586 B1 | | 9/2017 | Roche et al. |
| 10,009,337 B1 | * | 6/2018 | Fischer ............... H04L 67/1097 |
| 10,044,723 B1 | | 8/2018 | Fischer et al. |
| 10,469,330 B1 | * | 11/2019 | Roth ........................ H04L 41/22 |
| 2011/0126047 A1 | * | 5/2011 | Anderson ............... H04L 63/08 |
| | | | 709/224 |
| 2018/0041515 A1 | * | 2/2018 | Gupta ................. H04L 63/0815 |
| 2018/0063143 A1 | * | 3/2018 | Wilson .................... H04L 67/60 |
| 2018/0091555 A1 | | 3/2018 | Chen et al. |
| 2018/0337914 A1 | * | 11/2018 | Mohamad Abdul ........................ |
| | | | H04L 9/3213 |
| 2019/0095241 A1 | * | 3/2019 | Ago .................. G06F 16/24573 |
| 2019/0102162 A1 | * | 4/2019 | Pitre .................... H04L 63/104 |
| 2019/0253457 A1 | | 8/2019 | Koul et al. |
| 2022/0368726 A1 | * | 11/2022 | Balasubramaniam ...................... |
| | | | H04L 63/1441 |

OTHER PUBLICATIONS

Non-Final Rejction dated Oct. 27, 2020, from U.S. Appl. No. 16/131,377, 41 sheets.
Saha et al. Apache Tez: A Unifying Framework for Modeling and Building Data Processing Applications, ACM 978-1-4503-2758-9/15/05 (Year: 2015), 13 sheets.

* cited by examiner

FIG. 4

| COLUMN_NAME | DATA_TYPE |
|---|---|
| ID | NUMBER (10, 0) |
| ACTIVE | NUMBER (1, 0) |
| ADMINDISABLE | NUMBER (1, 0) |
| COMPLETEDDATETIMEUTC | TIMESTAMP (6) |
| CORRELATIONID | VARCHAR2 (36 CHAR) |
| PROVISIONDATETIMEUTC | TIMESTAMP (6) |
| PROVISIONSTATUS | VARCHAR2 (255 CHAR) |
| UPDATEDDATETIMEUTC | TIMESTAMP (6) |
| USERNAME | VARCHAR2 (64 CHAR) |

*FIG. 5*

- All operators onboarded onto the system will have a home directory in HDFS, located inside /user. For example, /user/a12345, where a12345 is an example of a user name. From now on, we'll call the user username, with home directory /user/username.

- All operators will have full (+read, +write, +execute) access rights in their home directory and any subdirectories. Operators may not delete their home directory.

- Operators will not be allowed to manage HDFS ACL's via shell actions. (dfs.namenode.acls.enbaled = false).

- Operators will be not allowed to alter access permissions via shell actions like chmod.

The /user directory gets mode 775, and is owned by hdfs.

```
rwxrwxr-x   hdfs  hdfs  0    /user
```

Each operator has a home directory inside of /user. This directory is owned by the user username and is set to mode 700.

```
rwxrwx---   hdfs  hdfs  0    /user/username
```

Special system controlled users that are part of Hadoop also own their own folders.

```
rwxrwx---   oozie hdfs  0    /user/oozie
rwxrwx---   spark hdfs  0    /user/spark
```

*FIG. 6*

- At operator onboarding time, an internal Hive database named username_database will be created.
- The operator may create any number of additional Hive databases with names starting with the name matching pattern username_*
- The operator has full permissions to select, update, create, drop, alter, index, and lock within each database he owns.

- Hive Authorization: Ranger
- Run as end user instead of Hive user: False
- Set the mode for HDFS /apps/hive to 770. This prevents users from using a shell action to view other people's internal Hive tables rwxrwx---   hdfs  hdfs  0   /apps/hive

- A wildcard Ranger policy allows the operator (e.g. a12345) full permissions on any database starting with username_ (e.g. a12345_*, where a12345 is a specific username)

- A Ranger policy allows the operator (e.g. a12345) full HDFS permissions on any directory on /apps/hive/warehouse/username_* (e.g. a12345_*)
- A Ranger policy allowing any user to WRITE and EXECUTE on /apps/hive/warehouse, non-recursive (This permissions is needed for a user to be able to create databases on their own.)

INGEST FILES ✕

DESCRIBE DATASET

NAME
[INGEST NAME]

DESCRIPTION
[ENTER A DESCRIPTION OF THE INGEST]

TAGS
[ENTER TAG AND CLICK ADD] [ADD]

SENSITIVITY MARKINGS
☐ NON-SENSITIVE
☐ PL-1 (PROPRIETARY LEVEL 1)
☐ PL-2 (PROPRIETARY LEVEL 2)
☐ COMPANY FINANCIAL DATA
☐ CONTROLLED UNCLASSIFIED DATA

[NEXT: SET PERMISSIONS] [CANCEL]

---

INGEST PROPERTIES ✕

DESCRIBE    PERMISSIONS    INGEST PATH

SET PERMISSIONS

OWNERS
OWNERS CAN MANAGE THE PIPELINE (GRANT PERMISSIONS, UPDATE, AND DELETE) AND VIEW, EDIT, ADD, AND INGEST FILES IN HDFS

[LI, LEON D]
[LAST NAME, FIRST OR MYID] [ADD]

USERS
USERS CAN VIEW, EDIT, ADD, AND INGEST FILES IN HDFS.

[LI, LEON D]
[LAST NAME, FIRST OR MYID] [ADD]

[SAVE] [BACK]

---

INGEST PROPERTIES ✕

DESCRIBE    PERMISSIONS    INGEST PATH

SUCCESS!
YOUR INGEST PIPELINE HAS BEEN CREATED

STEP 1: COPY FILE(S) TO INGEST PIPELINE
COPY FILES INTO THE LOCATION BELOW TO INGEST THEM INTO HDFS:

[INGEST PATH:\\INGEST-SERVER\USERNAME_TEST]

STEP 2: WAIT FOR INGEST TO COMPLETE
AFTER 3-5 MINUTES, YOUR FILE(S) WILL BE INGESTED INTO HDFS.
1. LOGIN TO HUE.
2. ACCESS FILE BROWSER IN HUE TO CONFIRM INGESTED FILES

[HDFS PATH: HDFS://INGEST/USERNAME/TEST]

STEP 3: NEXT STEPS
ONCE YOUR FILES ARE INGESTED, YOU MAY:
○ ANALYZE WITH HIVE OR PIG IN HUE
○ ANALYZE WITH PYTHON AND SPARK IN ZEPPELIN
○ CREATE HIVE TABLES FOR SQL-LIKE QUERYING OR TO SHARE DATASETS IN THE DATA CATALOG

[SAVE] [BACK]

| ♦COLUMN NAME | ♦DATA TYPE |
|---|---|
| INGEST_INGESTID | NUMBER (10,0) |
| OWNERS | VARCHAR2 (255 CHAR) |

| ♦COLUMN NAME | ♦DATA TYPE |
|---|---|
| INGEST_INGESTID | NUMBER (10,0) |
| SENSITIVITYMARKINGS | VARCHAR2 (255 CHAR) |

| ♦COLUMN NAME | ♦DATA TYPE |
|---|---|
| INGEST_INGESTID | NUMBER (10,0) |
| TAGS | VARCHAR2 (255 CHAR) |

| ♦COLUMN NAME | ♦DATA TYPE |
|---|---|
| INGEST_INGESTID | NUMBER (10,0) |
| USERS | VARCHAR2 (255 CHAR) |

| ♦COLUMN NAME | ♦DATA TYPE |
|---|---|
| INGESTID | NUMBER (10,0) |
| ACTIVE | NUMBER (1,0) |
| CORRELATIONID | VARCHAR2 (36 CHAR) |
| CREATEDDATETIMEUTC | TIMESTAMP (6) |
| DELETED | NUMBER (1,0) |
| DESCRIPTION | VARCHAR2 (255 CHAR) |
| FLUMEID | VARCHAR2 (255 CHAR) |
| INGESTSERVER | VARCHAR2 (255 CHAR) |
| NAME | VARCHAR2 (255 CHAR) |
| PROVISIONCOMPLETEDDATETIMEUTC | TIMESTAMP (6) |
| PROVISIONSTATUS | VARCHAR2 (255 CHAR) |
| SERVICEACCOUNTPRINCIPLE | VARCHAR2 (255 CHAR) |
| UPDATEDDATETIMEUTC | TIMESTAMP (6) |
| USERPRINCIPLE | VARCHAR2 (255 CHAR) |
| HDFSPATH | VARCHAR2 (255 BYTE) |
| INGESTPATH | VARCHAR2 (255 BYTE) |
| WINDOWSINGESTSERVER | VARCHAR2 (255 BYTE) |
| WINDOWSINGESTPATH | VARCHAR2 (255 BYTE) |

*FIG. 10*

FILES INGESTED BY INGEST JOB AGENTS ARE PLACED IN THE HDFS SINK FOLDER: /INGEST/USERNAME/INGESTJOBNAME.
THE HDFS FOLDER /INGEST AND ALL ITS SUBFOLDERS AND FILES ARE OWNED BY HDFS.

THE FOLLOWING RANGER ENTRIES ARE SET CONTROL ACCESS TO INGEST JOBS:

1. NAME: USERNAME_INGEST_READ
   PATH: /INGEST/USERNAME
   RECURSIVE: YES
   USER: USERNAME
   GROUP: NONE
   PERMISSIONS: RX (NO WRITE)
   PURPOSE: GRANTS THE USER WHO CREATES INGEST JOBS ABILITY TO ALWAYS READ THE /INGEST/USERNAME FOLDER. IMPORTANTLY, NO WRITE PREVENTS THE USER FROM ACCIDENTALLY DELETING INGEST JOB FOLDERS.

2. NAME: USERNAME_INGESTS
   PATH: /INGEST/USERNAME/*
   RECURSIVE: YES
   USER: USERNAME
   GROUP: NONE
   PERMISSIONS: RWX
   PURPOSE: GRANTS THE USER WHO CREATES INGEST JOBS ABILITY TO ALWAYS MAKE CHANGES (ADD AND DELETE) TO THE DATA HE INGESTS

3. NAME: INGEST_INGESTJOBNAME
   PATH: /INGEST/USERNAME/INGESTJOBNAME
   RECURSIVE: YES
   USER: USERNAME
   GROUP: INGESTJOBNAME
   PERMISSIONS: RWX
   PURPOSE: GRANTS THE USER WHO CREATED INGESTJOBNAME AS WELL AS THE OWNERS AND USERS HE ASSIGNED VIA THE PORTAL THE ABILITY TO READ AND MAKE CHANGES (ADD AND DELETE) TO THE DATA OF INGESTJOBNAME. ALSO GRANTS THESE USERS THE ABILITY TO CREATE HIVE TABLES WHICH POINTS TO THE DATA OF INGESTJOBNAME. NOTE: THIS RANGER ENTRY DOES NOT PERMIT DELETING /INGEST/USERNAME/INGESTJOBNAME BY ANY USER

NAME: HIVE_FLUME_INGEST
   PATH: /INGEST/*/*Z
   RECURSIVE: YES
   USER: HIVE
   GROUP: NONE
   PERMISSIONS: RWX
   PURPOSE: GRANTS HIVE THE ABILITY TO CREATE TABLES USING DATA IN ANY INGEST JOB. FOR EXAMPLE, A TABLE CAN BE CREATED BY USERNAME WITH LOCATION '/INGEST/USERNAME/INGESTJOBNAME/' WITH THE ABILITY TO INSERT DATA INTO THIS TABLE BY USERNAME. IMPORTANTLY, DOES NOT GRANT HIVE THE ABILITY TO DROP THE FOLDER /INGEST/USERNAME/INGESTJOBNAME/. HIVE WILL SUCCESSFULLY DROP AN INTERNAL TABLE IN THE METASTORE POINTED TO BY LOCATION /INGEST/ USERNAME/INGESTJOBNAME/, BUT THIS WILL NOT DELETE THE FOLDER /INGEST/USERNAME/INGESTJOBNAME/.

FIG. 11

SYSTEM AND METHOD FOR SECURE MULTITENANT OPERATIONS OF A DISTRIBUTED COMPUTING CLUSTER

CROSS REFERENCE TO RELATED APPLICATIONS

This application is a divisional application of U.S. patent application Ser. No. 16/131,377 filed on Sep. 14, 2018, herein incorporated by reference in its entirety.

BACKGROUND

Distributed computing clusters such as Hadoop are powerful systems for distributed data storage and processing, and are used widely in the computing industry. Hadoop is an open-source software framework used for distributed storage and processing of dataset of big data. Hadoop consists of computer clusters built from commodity hardware. All the modules in Hadoop are designed with a fundamental assumption that hardware failures are common occurrences and should be automatically handled by the framework.

At the core of Hadoop is a storage part, known as Hadoop Distributed File System (HDFS), and a processing part, which is a MapReduce programming model. Hadoop splits files into large blocks and distributes them across nodes in a cluster. Hadoop then transfers packaged code into nodes to process the data in parallel. This approach takes advantage of data locality in which nodes manipulate the data to which they have access. This allows the dataset to be processed faster and more efficiently than it would be in a more conventional supercomputer architecture that relies on a parallel file system where computation and data are distributed via high-speed networking. Numerous articles and papers that describe Hadoop are available, online and otherwise.

Originally, Hadoop clusters were designed with perimeter security only, such that an operator who has been granted access to a Hadoop cluster becomes able to access to read and modify all data on the Hadoop cluster, and perform any data processing on the Hadoop cluster.

More recently, various inventors have described and implemented features for Hadoop to achieve multitenant data storage and multitenant data processing. These include security access layers such as Apache Ranger™ and Cloudera Sentry™ that intercept data access requests and apply access rules.

As noted, multitenancy for Hadoop exists, such as described in U.S. Pat. Nos. 9,130,920 and 9,628,486. Multitenant data storage in general also exists. What is needed, however, are novel and effective methods of securing and automating certain operations that build on top of Hadoop multitenancy.

SUMMARY

The presently disclosed subject matter relates to systems and methods for secure operator onboarding and creating an ingest job agent for secure multitenant operations of a distributed computing cluster. Embodiments overcome the disadvantages of the prior art and provide other advantages as described herein. These and other advantages may be provided, for example, by a method of secure operator onboarding for secure multitenant operations of a distributed computing cluster is provided. The method includes receiving a network service call from a client computer containing credentials of an operator, in which the client computer is located in a network security domain coupled to the distributed computing cluster, initiating the network service call to a centralized directory and authentication server, which is located in the network security domain, to authenticate the operator using the transmitted credentials, presenting a user interface to collect a plurality of configurable attestations from the operator, storing the configurable attestations to a data store in the centralized directory and authentication server, initiating a series of asynchronous operations for the onboarding, and updating a metadata store in the distributed computing cluster to indicate to the operator that onboarding is completed.

The series of asynchronous operations may include registering the operator to the distributed computing cluster, adding a distributed home directory on the distributed computing cluster, creating a first access control list entry which grants and limits access to the distributed home directory to the on-boarded operator, adding a distributed database on the distributed computing cluster, and creating a second access control list entry which grants and limits access to the distributed home database.

The registering the operator to the distributed computing cluster may include adding the operator to the distributed computing cluster such that a user account of the operator exists on each computer of the distributed computing cluster. The registering the operator to the distributed computing cluster may include initiating with the operator as a process owner on every node of the distributed computing cluster. The registering the operator to the distributed computing cluster may include creating a shadow account on every node of the distributed computing cluster.

The second access control list may enable future databases created by the operator to be granted and limited access to the operator. The distributed home directory may be embodied by a Hadoop file system directory on the distributed computing cluster. The distributed database may be embodied by a Hive database stored on the distributed computing cluster.

The method of secure operator onboarding may further include producing user onboarding start tracking messages after the initiating the series of asynchronous operations for the onboarding, creating an in-memory thread for each tracking message, setting a thread execution time limit, checking a task status for completion in the in-memory thread, and producing an asynchronous computing cluster command module task completion message. The method of secure operator onboarding may further include adding a security layer entry to grant on-boarded user access to home directory and home database after the asynchronous computing cluster command module task completion message is produced, and writing to database completion state for the user onboarding.

Computers of the distributed computing cluster may be coupled to a security domain that is managed by a domain controller. The metadata store may be in the security domain of the distributed computing cluster. A Kerberos base domain trust may exist between a network security domain of the centralized directory and authentication server and the security domain coupled to the distributed computing cluster. A network of the centralized directory and authentication server may be coupled to a network of the distributed computing cluster.

These and other advantages may also be provided, for example, by a non-transitory computer readable medium in a computing device that has a processor is provided. The computing device is coupled to a distributed computing cluster, and the non-transitory computer readable medium has instructions for secure operator onboarding for secure multitenant operations of the distributed computing cluster. The instructions cause the processor to perform operations that comprise steps of receiving a network service call from a client computer containing credentials of an operator, in which the client computer is located in a network security domain coupled to the distributed computing cluster, initiating the network service call to a centralized directory and authentication server, which is located in the network security domain, to authenticate the operator using the transmitted credentials, presenting a user interface to collect a plurality of configurable attestations from the operator, storing the configurable attestations to a data store in the centralized directory server, initiating a series of asynchronous operations for the onboarding, and updating a metadata store in the distributed computing cluster to indicate to the operator that onboarding is completed.

These and other advantages may further be provided, for example, by a method of creating an ingest job agent for secure multitenant operations of a distributed computing cluster is provided. The method includes receiving a network service call from a client computer containing credentials of an operator, in which the client computer is located in a network security domain coupled to the distributed computing cluster, initiating the network service call to a centralized directory server, which is located in the network security domain, to authenticate the operator using the transmitted credentials, presenting a user interface to collect a plurality of ingest job agent configuration options from the operator, storing the ingest job agent configuration options to a data store in the centralized directory server, initiating a series of asynchronous operations to create the ingest job agent, and updating a metadata store in the distributed computing cluster to indicate to the operator that the creation of the ingest job agent is completed.

The series of asynchronous operations may include creating an ingest source folder in an ingest server where files shall be transferred from, creating an ingest sink folder on a distributed file system where files are transferred to, creating an access control list entry which grants and limits access of the ingest source folder and the ingest sink folder to the operator of the ingest job agent and other operators specified by the operator, and initiating an in-memory process which monitors and moves files an authorized operator deposits inside the ingest source folder into the ingest sink folder via network file transfer. The series of asynchronous operations may further include creating a shadow account on every node of the distributed computing cluster.

The method of creating an ingest job agent may further include producing ingest job creation task start tracking messages after the initiating a series of asynchronous operations for the creation of ingest job agent, creating an in-memory thread for each tracking message, setting a thread execution time limit, checking a task status for completion in the in-memory thread, and producing an asynchronous computing cluster command module task completion message. The method of creating an ingest job agent may further include adding a security layer entry to grant an access control authorization of the ingest job folder to the operator, and writing to database completion state for the ingest job creation.

These and other advantages may also be provided, for example, by a non-transitory computer readable medium in a computing device that has a processor is provided. The computing device is coupled to a distributed computing cluster, and the non-transitory computer readable medium has instructions for creating an ingest job agent for secure multitenant operations of a distributed computing cluster. The instructions cause the processor to perform operations that comprise steps of receiving a network service call from a client computer containing credentials of an operator, in which the client computer is located in a network security domain coupled to the distributed computing cluster, initiating the network service call to a centralized directory server, which is located in the network security domain, to authenticate the operator using the transmitted credentials, presenting a user interface to collect a plurality of ingest job agent configuration options from the operator, storing the ingest job agent configuration options to a data store in the centralized directory server, initiating a series of asynchronous operations to create the ingest job agent, and updating a metadata store in the distributed computing cluster to indicate to the operator that the creation of the ingest job agent is completed.

BRIEF DESCRIPTIONS OF DRAWINGS

Figure 4:
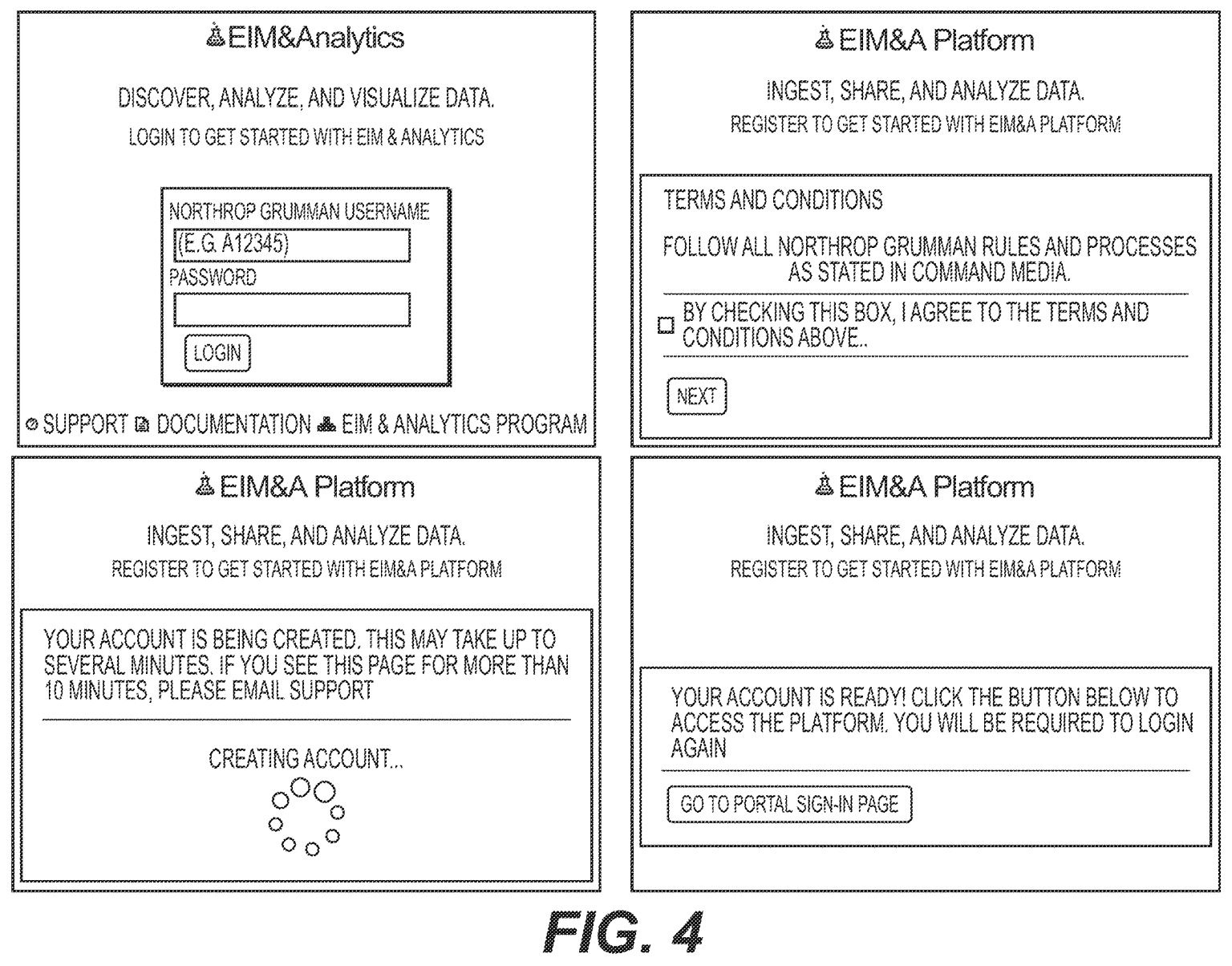

FIG. 4 shows examples of operator onboarding and attestation screens.

FIG. 5 shows a screen displaying an exemplary schema of the user attestation and metadata data store.

FIG. 6 shows a screen displaying an exemplary cluster file system security model.

FIG. 7 shows a screen displaying an exemplary cluster hive database security model.

FIG. 9 shows examples of ingest job agent creation screens.

FIG. 10 shows an exemplary schema for ingest metadata store.

FIG. 11 shows an example of ingest job agent security layer policies.

DETAILED DESCRIPTIONS

Figure 1:
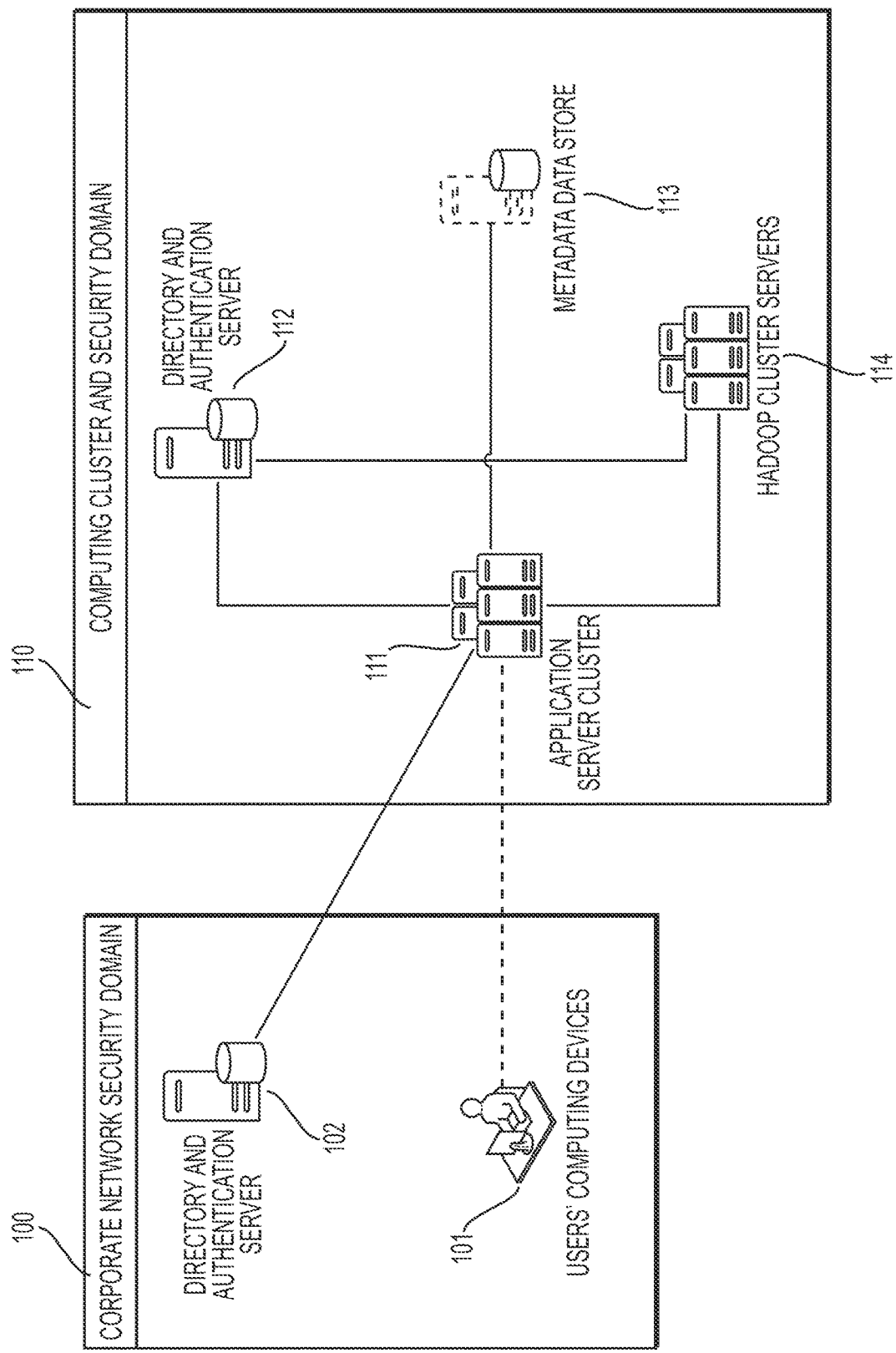
FIG. 1 illustrates network architecture of secure distributed computing cluster in a multi-security domain network of computers.

It is to be understood that the figures and descriptions of the present invention may have been simplified to illustrate elements that are relevant for a clear understanding of the present invention, while eliminating, for purposes of clarity, other elements found in a typical mobile applications architecture or typical method for sharing data. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Described herein are embodiments of a system and method for secure multitenant operations and data transfer into a distributed computing cluster. An embodiment automates the operator onboarding process to the Hadoop distributed computing cluster, including creation of logically separated, distributed data stores and computing resources and user accounts. Embodiments provide novel systems and methods for securing and automating certain operations that build on top of Hadoop multitenancy. Embodiments enable data transfer into distributed computer clusters in a secure manner. An embodiment further creates security with isolated data transfer pipelines into the logically separated, distributed data stores inside the Hadoop cluster to enable operators to securely transfer files to the Hadoop computing cluster.

Embodiments automate multitenant operations for Hadoop clusters. These operations include automation of operator onboarding, creation of logically segregated distributed data stores within Hadoop for the on-boarded operator, and creation of ingest agents with security isolation for transfer of large quantities of files into Hadoop clusters.

Embodiments provide multitenant security. Multitenant security means that the same Hadoop cluster serves multiple operators with each operator's data and processes in effective isolation. In this manner, multitenant security keeps each user's data storage and operations on the Hadoop cluster separated from other operators. Multitenant security provided by embodiments described herein includes system security settings that prevent any operator from accessing another operator's (the "owner operator's") files and operations on the Hadoop cluster without the owner operator's authorization.

These multitenancy features have the potential to improve Hadoop's usefulness for certain applications that logically separate data storage and processing on a single large Hadoop cluster's hardware, but for which multiple operators or groups of operators share the same hardware. This scheme has many benefits compared to perimeter based security, such as increased efficiency from sharing the same set of hardware, as well as eliminating the need to transfer data among different Hadoop clusters when operators or groups of operators want to share data.

In the current state of the art, working with Hadoop clusters with security access layers for multitenancy is slow and cumbersome. Access control list entries require manual configuration by multiple operators and administrators. Furthermore, components outside of the Hadoop cluster, such as data ingestion components must also interface with the Hadoop security layer, and must be configured to support multitenancy themselves by multiple operators and administrators.

This disclosure describes embodiments systems and methods invented to enhance multitenant use of a Hadoop cluster, where each operator interfaces with the system to perform multitenant tasks without requiring intervention by other operators and administrators. Embodiments include automation of secure operator onboarding, creation of logically segregated distributed data stores within Hadoop cluster for the on-boarded operator, and creation of ingest job agents with security isolation for transfer of large quantities of files into the Hadoop clusters.

Embodiments are related to a network of computers, configurations, in-memory processes, data stores on the network of computers, which together enhance multitenant use of a Hadoop cluster.

FIG. 1 shows a network architecture of secure distributed computing cluster in a multi-security domain network of computers. A corporate network security domain 100, which includes user computing devices 101 and a centralized directory and authentication server 102, is coupled to a computing cluster and security domain 110. The user computing devices 101 and the centralized directory and authentication server 102 are each coupled to an application server cluster 111 that is located in a computing cluster and security domain 110. The application server cluster 111 is coupled to a directory and authentication server 112, metadata data store 113 and Hadoop cluster servers 114, which are included in the computing cluster and security domain 110.

Figure 2:
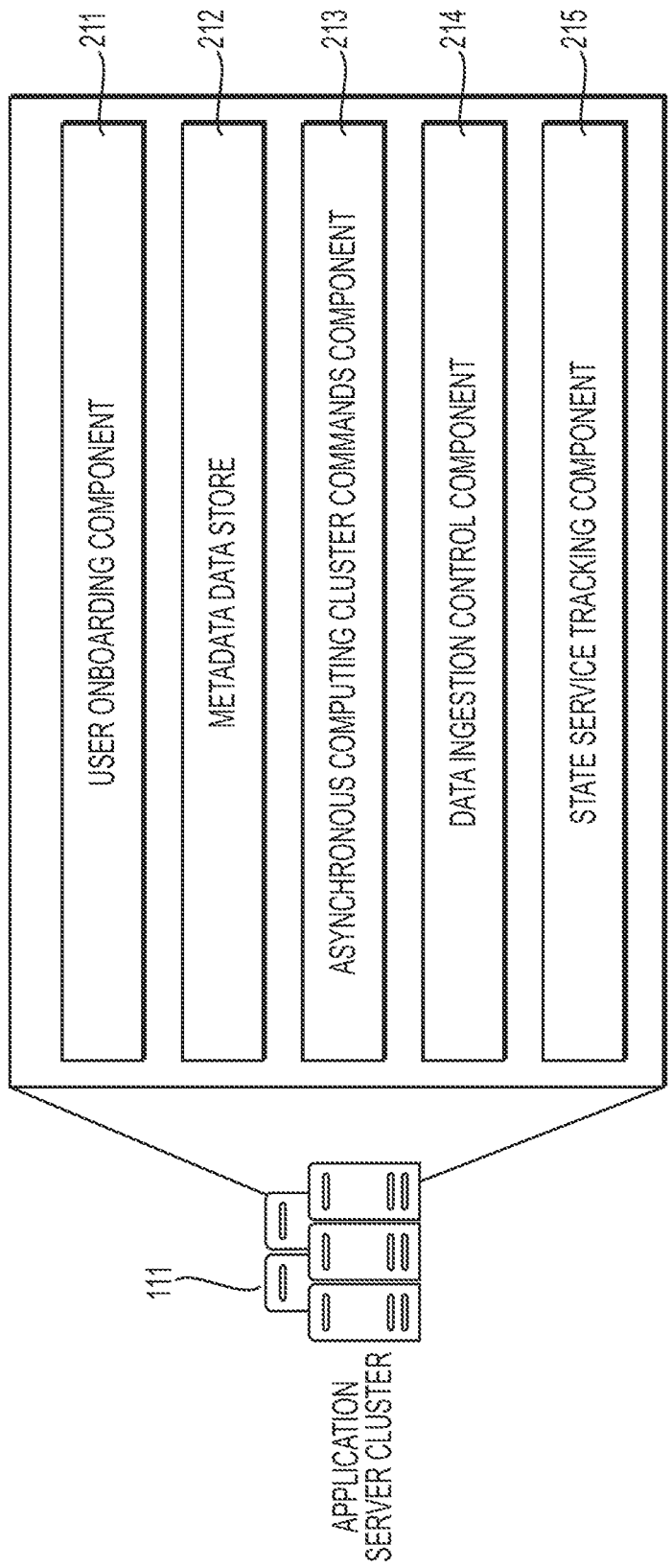
FIG. 2 shows components of the application server cluster.

FIG. 2 shows components of the application server cluster. As shown in FIG. 2, the application server cluster 111 includes programing modules or control components for user onboarding component 211, metadata data store component 212, asynchronous computing cluster commands component 213, data ingestion control component 214, and state service tracking component 215. These components may be programing instructions which cause one or more processors to execute operations according to the instructions. Functions of these components will be described below referring to the workflows shown in FIGS. 3 and 8.

An embodiment includes a system for controlling operator access to a distributed computing cluster, embodied by a Hadoop cluster, as shown in FIGS. 1 and 2. Computers of the distributed computing cluster 110 are joined to a security domain inside the distributed computing cluster 110, managed by a domain controller. Operator metadata are stored inside a centralized directory and authentication server 102 inside a network security domain 100 that is located outside of the security domain of the distributed computing cluster 110. Operator metadata specific to the system are stored inside a computer store inside the security domain of the computing cluster 110. FIG. 5 shows an example of the user attestation and metadata data store shown in a user interface. FIG. 10 shows an example of ingest metadata store shown in a user interface. These user attestation and metadata store and the ingest metadata store are stored inside the security domain of the computing cluster 110.

A computer network of the centralized directory and authentication server 102 is coupled to the computer network of the distributed computing cluster 110. In an embodiment, a Kerberos base domain trust exists between the security domain of the centralized directory and authentication server 102 and the security domain of the distributed computing cluster 110. Access to files, folders, databases, database objects, and other storage elements are controlled by access control lists, such that visibility and/or access to artifacts and storage elements are restricted by the aforementioned metadata driven security system and attestation store. FIG. 6 shows a cluster file system security model as an example of the access control lists, and FIG. 11 shows an ingest job agent security layer policies as an example of the access control lists. Distributed query processes, which are embodied Hadoop based queries on the distributed computing platform, are executed in the security context of the operator, are hardened, and queries execute using the user's security context.

One embodiment of the present invention provides a method of securing and automating an operator onboarding process. The user onboarding component consists of in-memory processes running on a plurality of computers coupled to the centralized directory server and the network of the distributed computing cluster, and has been programmed to perform operations as shown in flowcharts in FIGS. 3A-3E. The operator onboarding process may be described as follows.

1) A network service call from the web browser of a client computer containing operator credentials is received.
2) A network service call to the centralized directory server to authenticate the operator using the transmitted credentials is initiated.
3) A user interface in the operator's web browser is presented to collect a plurality of attestations from the operator and to store them inside an attestation store. Screens of examples of operator onboarding and attestation are shown in FIG. 4, and a screen displaying an exemplary schema of the user attestation and metadata data store is shown in FIG. 5.
4) A series of asynchronous operations in a correct order based on success/fail status is initiated. The correct order is shown in FIGS. 3A-3E, which will be described below.
5) A metadata store in the computer store inside the network of the computing cluster is updated to indicate to the operator that onboarding is completed.

The process of initiating a series of asynchronous operations in the correct order based on success/fail status, described above, may further include the following processes.

a) The operator is added to the distributed cluster such that the operator's user account exists on each computer of the cluster, or in-memory processes can be instantiated with the owner operator as the process owner on every node of the computer cluster;
b) A distributed home directory, which is embodied by a Hadoop file system directory on the distributed cluster, is added;
c) An access control list entry, which grants and limits access to the distributed home directory to the onboarded operator only, is added. A screen displaying an exemplary cluster file system security model to create the access control list entry is shown in FIG. 6;
d) A distributed database, which is embodied by a Hive database stored in a distributed fashion on the distributed cluster, is added. A screen displaying an exemplary cluster hive database security model to add the distributed database is shown in FIG. 7; and
e) An access control list entry is created. The access control list entry grants and limits access to the distributed home database, and enables future Hive databases created by the operator and named, for example, with a name starting with the operator's username followed by an underscore symbol, to be granted and limited access to the operator only.

Figure 3A:
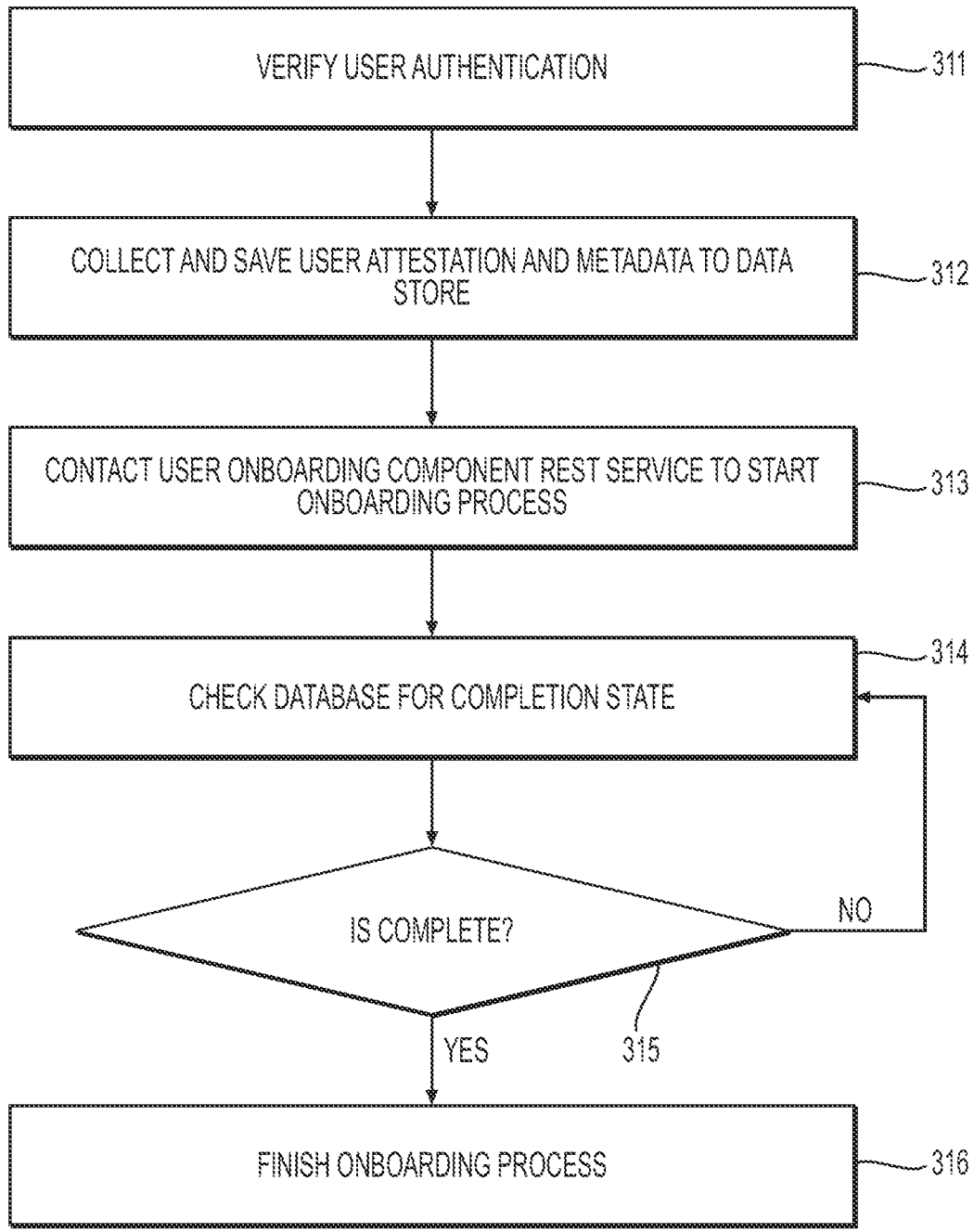
FIGS. 3A-3E shows workflow diagrams for automated process flow to onboard operators the distributed computing cluster to enable multitenant operations by the on-boarded operator.

FIGS. 3A-3E shows workflow diagrams for automated process flow to onboard operators on the distributed computing cluster to enable multitenant operations by the onboarded operator. FIG. 3A shows processes performed by a user onboarding component user interface controller. Referring to FIG. 3A, the user authentication is verified, block 311, and user attestation and metadata are collected and saved to a data store, block 312. The data store may be referred to as an attestation store. In order to start user onboarding process, user onboarding component service is contacted, block 313. This component service may be a representational state transfer (REST) service. The processes of the user onboarding component service is shown in the flowchart in FIG. 3B in detail. Then, database is checked for completion state, block 314. Block 315 may include waiting or pausing for checking, or in order to check, completion of the user onboarding process. If the onboarding is not completed, the database checking process is continued. Once the database for the user onboarding is established, the user onboarding process is finished, block 316.

Figure 3B:
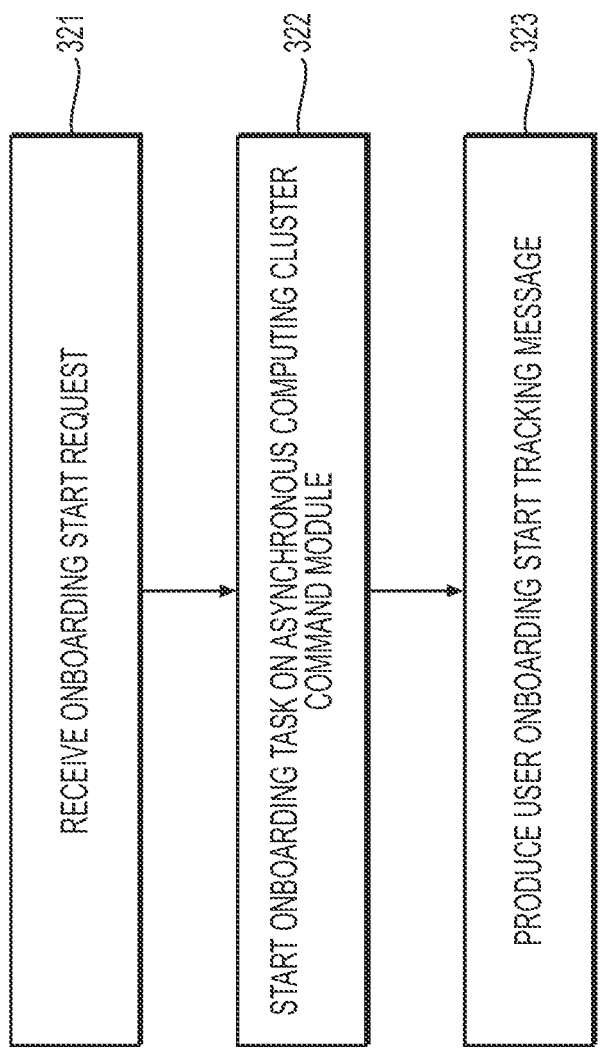

FIG. 3B shows processes performed by a user onboarding component, which are performed in block 313 in FIG. 3A. Onboarding start request is received, block 321. Onboarding task starts on asynchronous computing cluster command module, block 322. This process is specifically shown in FIG. 3C. Then, user onboarding start tracking message is produced, block 323.

Figure 3C:
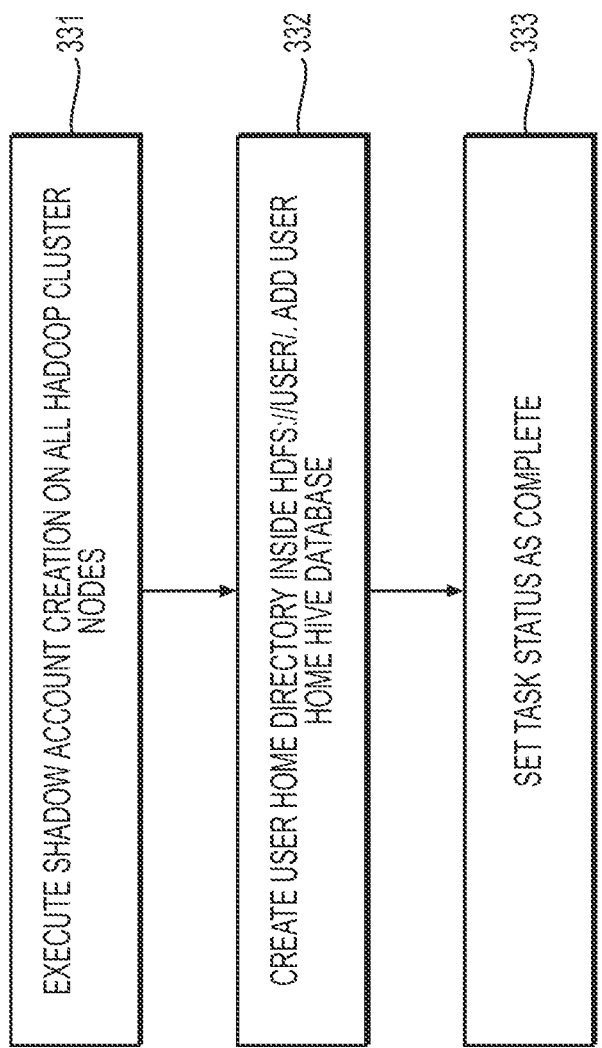

FIG. 3C illustrates processes for asynchronous computing cluster command component task. A shadow account is created on all Hadoop cluster nodes, block 331. A user home directory is created in the computing cluster, block 332. The home directory may have a form of hdfs://user/. A user home hive database is also added. When the user home directory is successfully created and the user home database is added, the task is set as complete, block 333.

Figure 3D:
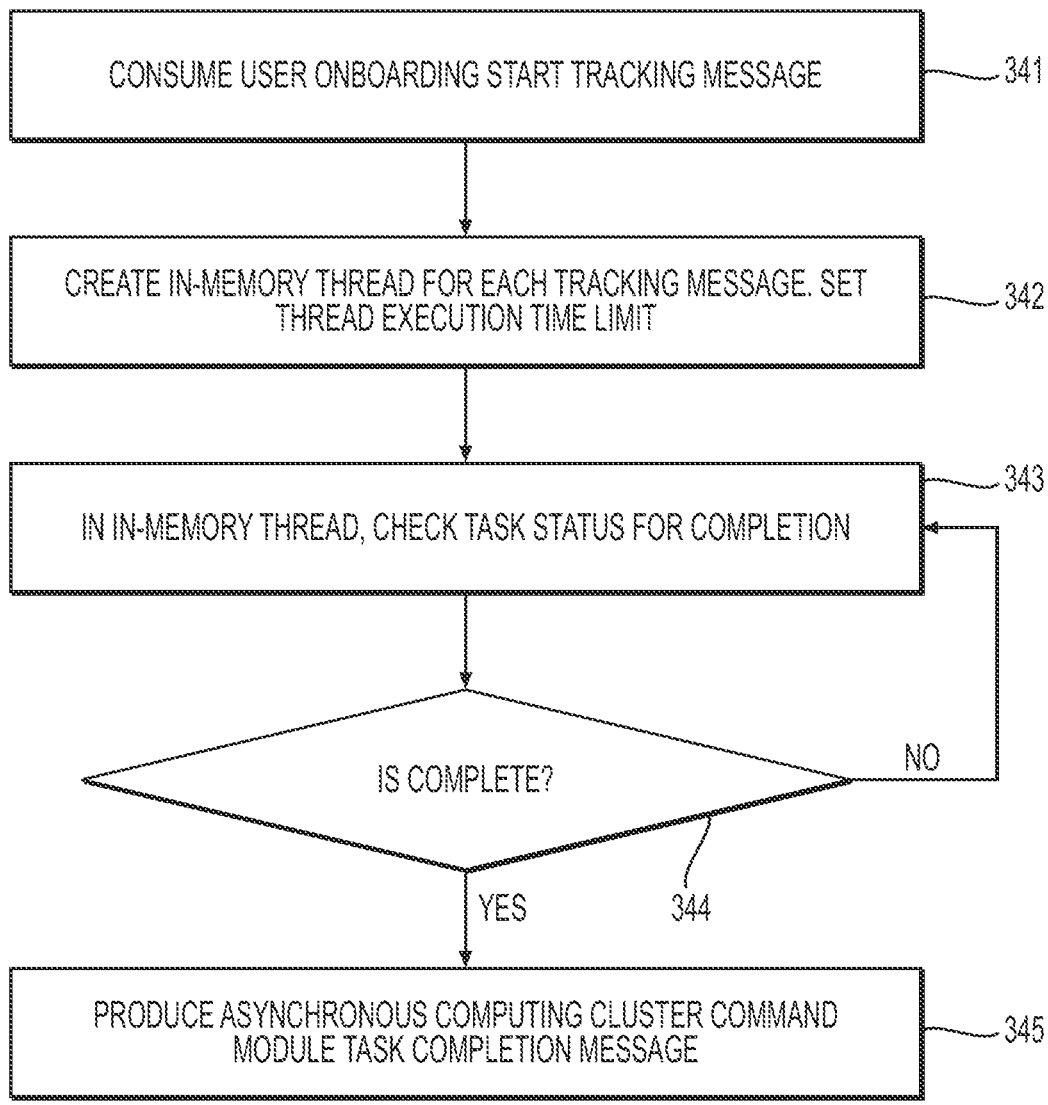

FIG. 3D shows processes performed by state service tracking component. The user onboarding start tracking message, which is produced in the process 323, is consumed, block 341. In-memory thread for each tracking message is created, and thread execution time limit is set, block 342. In the in-memory thread, task status is checked for completion, block 343. This checking status process continues until the task is completed, block 344. Once the task is completed, asynchronous computing cluster command module task completion message is produced, block 345.

Figure 3E:
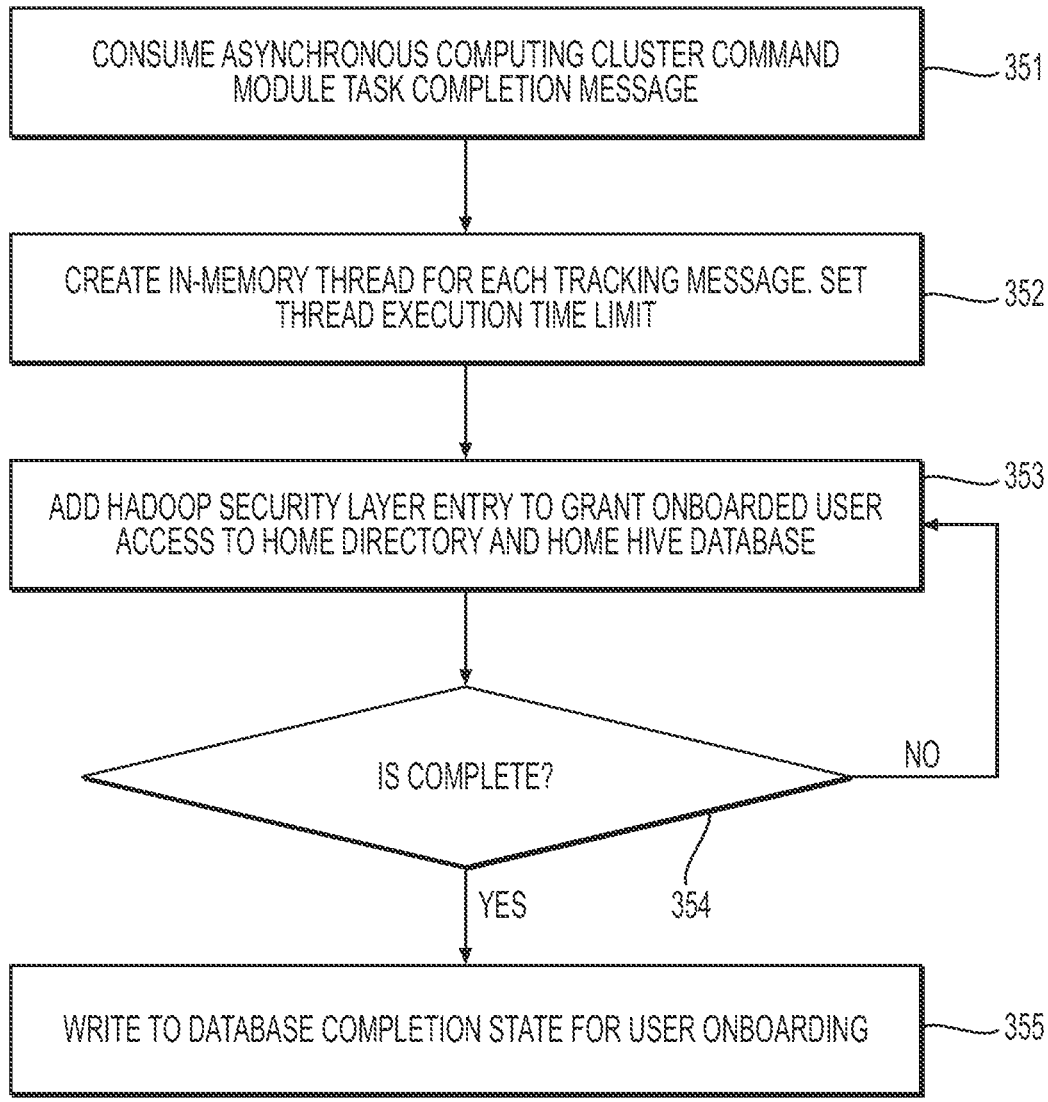

FIG. 3E shows processes for user onboarding component response handler. The asynchronous computing cluster command module task completion message, which is produced in the process 345, is consumed, block 351. In-memory thread for each tracking message is created, and thread execution time limit is set, block 352. Hadoop security layer entry, which may be an access control list entry, to grant on-boarded user access to the home directory and home hive database is added, block 353. When the Hadoop security layer entry is completed, block 354, database completion state for user onboarding is written, block 355. When the database completion state for user onboarding is written, the wait or pause, block 315, shown in FIG. 3A ends, and onboarding process is completed.

The embodiment may include one or more computing systems that include at least one processor and at least one computer readable medium. The computing systems are coupled to a network of distributed computing cluster. The processes for the secure operator onboarding as described above may be stored in a computer readable medium as computer executable instructions. The processor, which is coupled to the computer readable medium, may read the instructions and execute the computer executable instruction that causes the one or more computing systems to perform operations for the secure operator onboarding for secure multitenant operations of a distributed computing cluster.

Another embodiment of the present invention provides a method of creating ingest job agents with security isolation for transfer of large quantities of files into the Hadoop clusters. A data ingest control component consists of in-memory process running on a plurality of computers coupled to the centralized directory server and the network of the computing cluster, and has been programmed to perform operation shown in FIGS. 8A-8E. The processes for creating ingest job agents may be described as follows.

1) A network service call from the web browser of a client computer containing operator credentials is received.

2) A network service call to the centralized directory server to authenticate the operator using the transmitted credentials is initiated.
3) A user interface in the operator's web browser to collect a plurality of ingest job agent configuration options from the operator is presented, and the ingest job agent configuration options are stored inside the metadata store. An example of the ingest job agent creation screen is shown in FIG. 9.
4) A series of asynchronous operations in a correct order based on success/fail status is initiated. The correct order is shown in FIGS. 8A-8E, which will be described below.
5) A metadata store in the computer store inside the network of the computing cluster is updated to indicate to the operator that ingest job agent creation is completed.

The process of initiating a series of asynchronous operations in the correct order based on success/fail status, described above, may further include the following processes.
 a) A folder in an ingest server, where files shall be transferred from, is created. This fold is referred to as an ingest source folder. See FIG. 9.
 b) A folder on the distributed file system, embodied by the Hadoop distributed file system, where files are transferred to, is created. This folder is referred to as a sink folder. See FIG. 9.
 c) An access control list entry is created. The access control list entry grants and limits access of the ingest source folder and the ingest sink folder to the owner operator of the ingest job and other operators specified by the owner operator.
 d) An in-memory process is initiated. The in-memory process may be executed to move files, which an authorized operator deposits inside the ingest source folder, into the ingest sink folder via network file transfer.

Figure 8A:
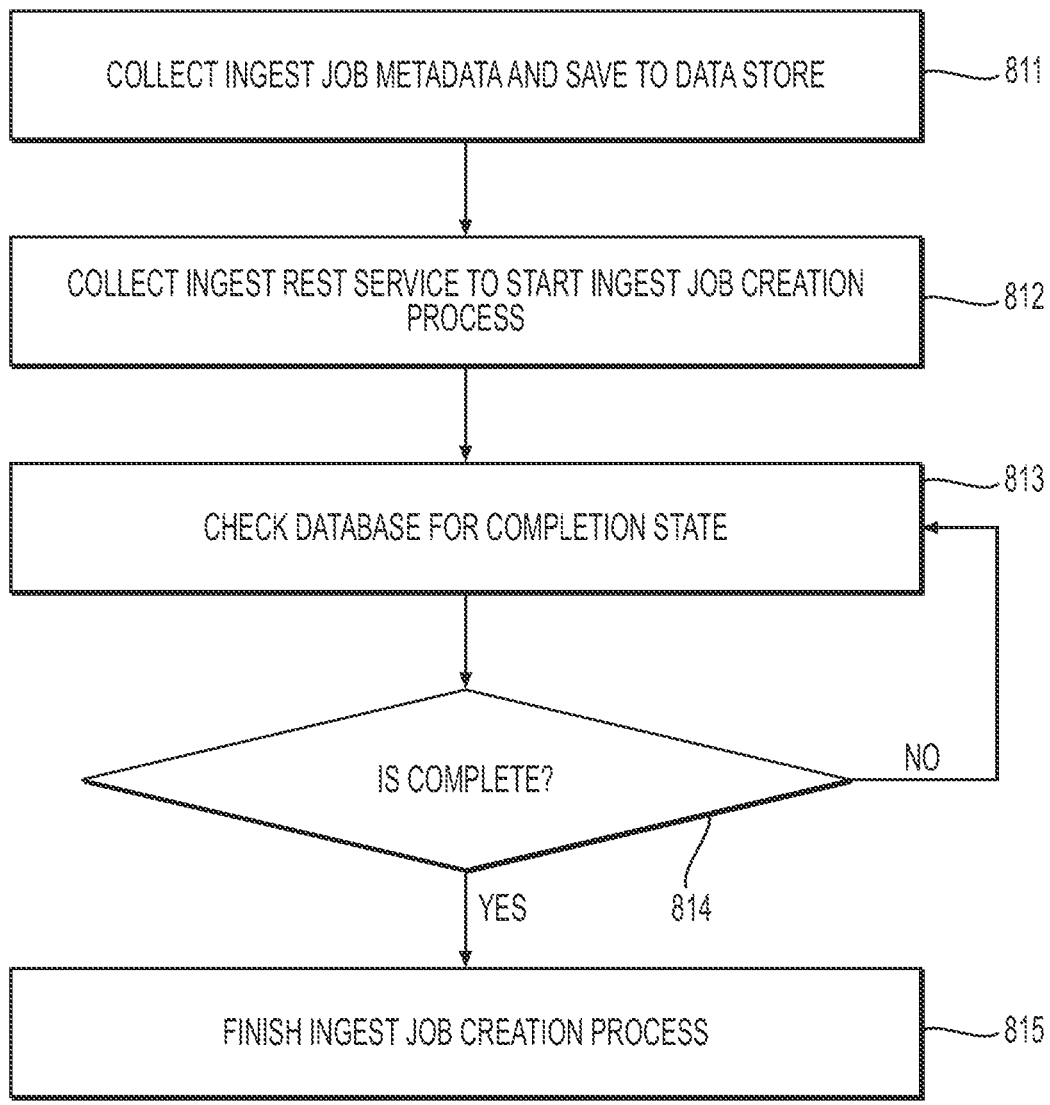
FIGS. 8A-8E shows workflow diagrams to set up ingest job agents on distributed computing cluster to enable multitenant data ingest onto the platform.

FIGS. 8A-8E shows workflow diagrams to set up ingest job agents on distributed computing cluster, which may enable multitenant data ingest onto the platform. FIG. 8A illustrates processes performed by an ingest job component user interface controller. Referring to FIG. 8A, ingest job metadata is collected and is save to data store, block 811. Ingest REST service to start ingest job creation process is collected, block 812. The processes of the ingest REST service is shown in the flowchart in FIG. 8B in detail. Database is monitored to check the completion state, block 813. Block 814 may include waiting or pausing for checking, or in order to check, completion of the ingest job creation process. If the ingest job creation is not completed, the database checking process is continued. Once the ingest job creation is completed, the ingest job creation process is finished, block 815.

Figure 8B:
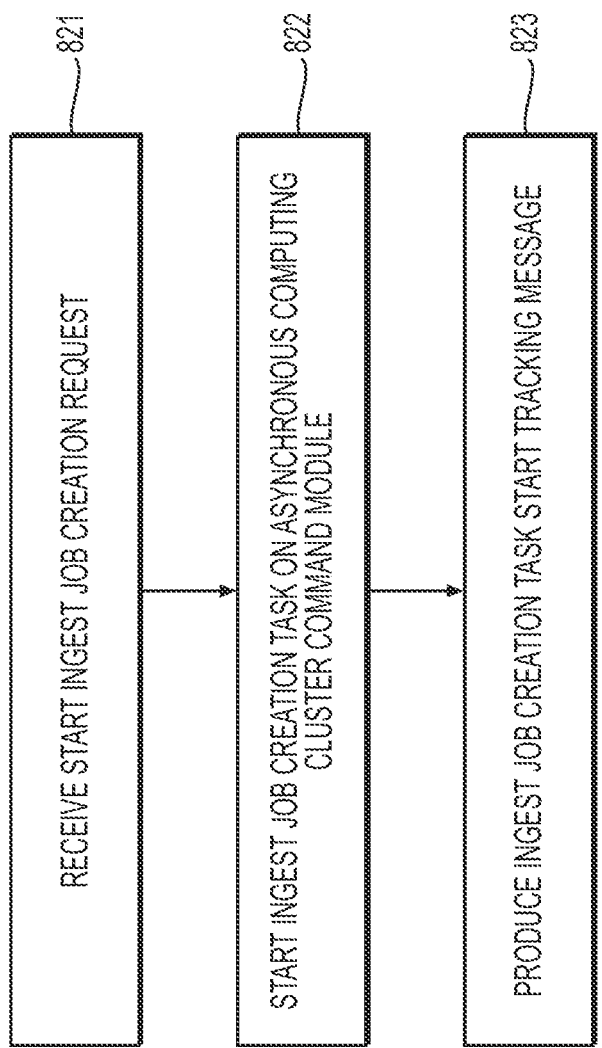

FIG. 8B illustrates processes for ingest job component REST service performed in block 812. A request to start ingest job creation is received, block 821. Ingest job creation task is started on asynchronous computing cluster command module, block 822. Ingest job creation task start tracking message is produced, block 823.

Figure 8C:
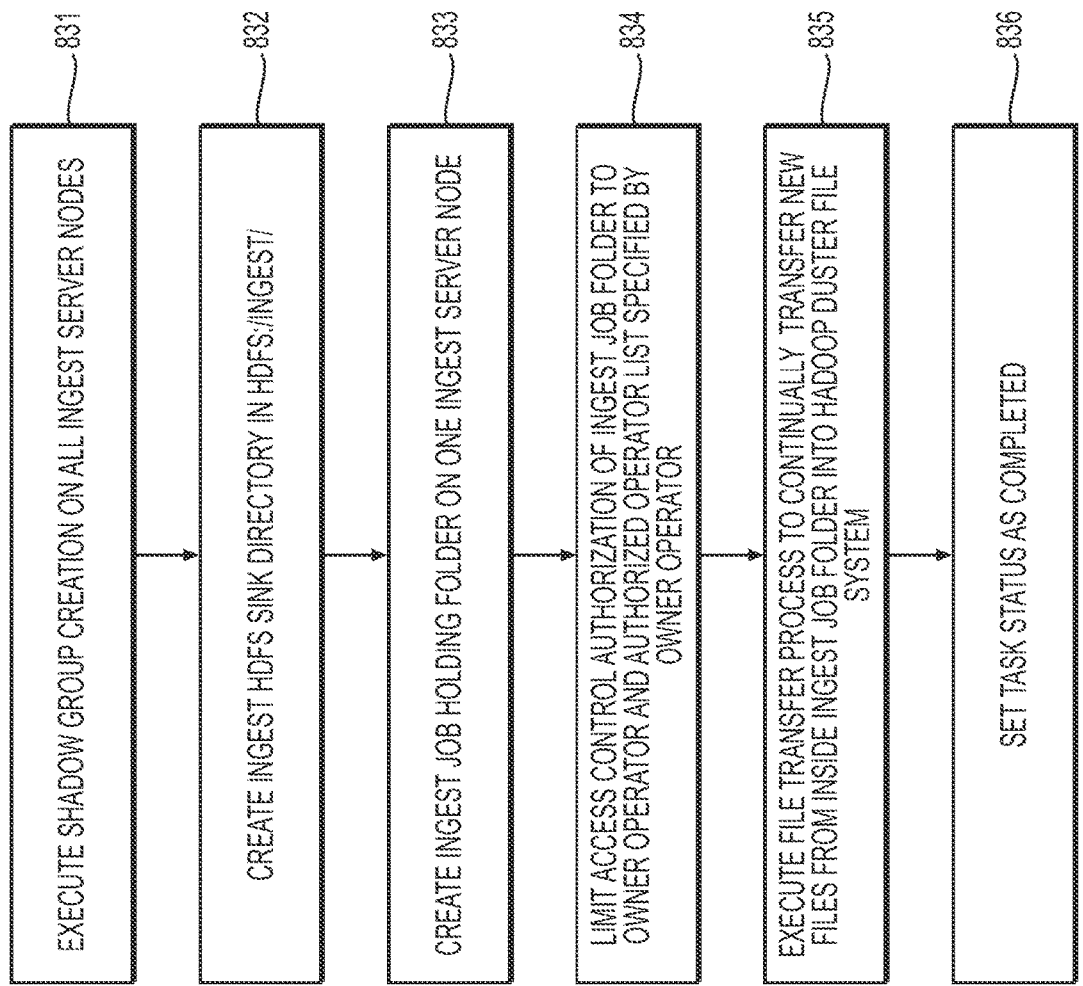

FIG. 8C illustrates processes of asynchronous computing cluster command component task. Shadow group is created on all ingest server nodes, block 831. An ingest sink directory is created, block 832. This sink directory may be HDFS sink directory and may have a form of hdfs:/ingest/. An ingest job holding folder, which may be an ingest source folder, is created on one ingest server node, block 833. Access control authorization of the ingest job folder is limited to owner operator and authorized operator list specified by owner operator, block 834. File transfer process is executed to continually transfer new files from inside ingest job folder into Hadoop cluster file system, block 835. The, task status is set as completed, block 836.

Figure 8D:
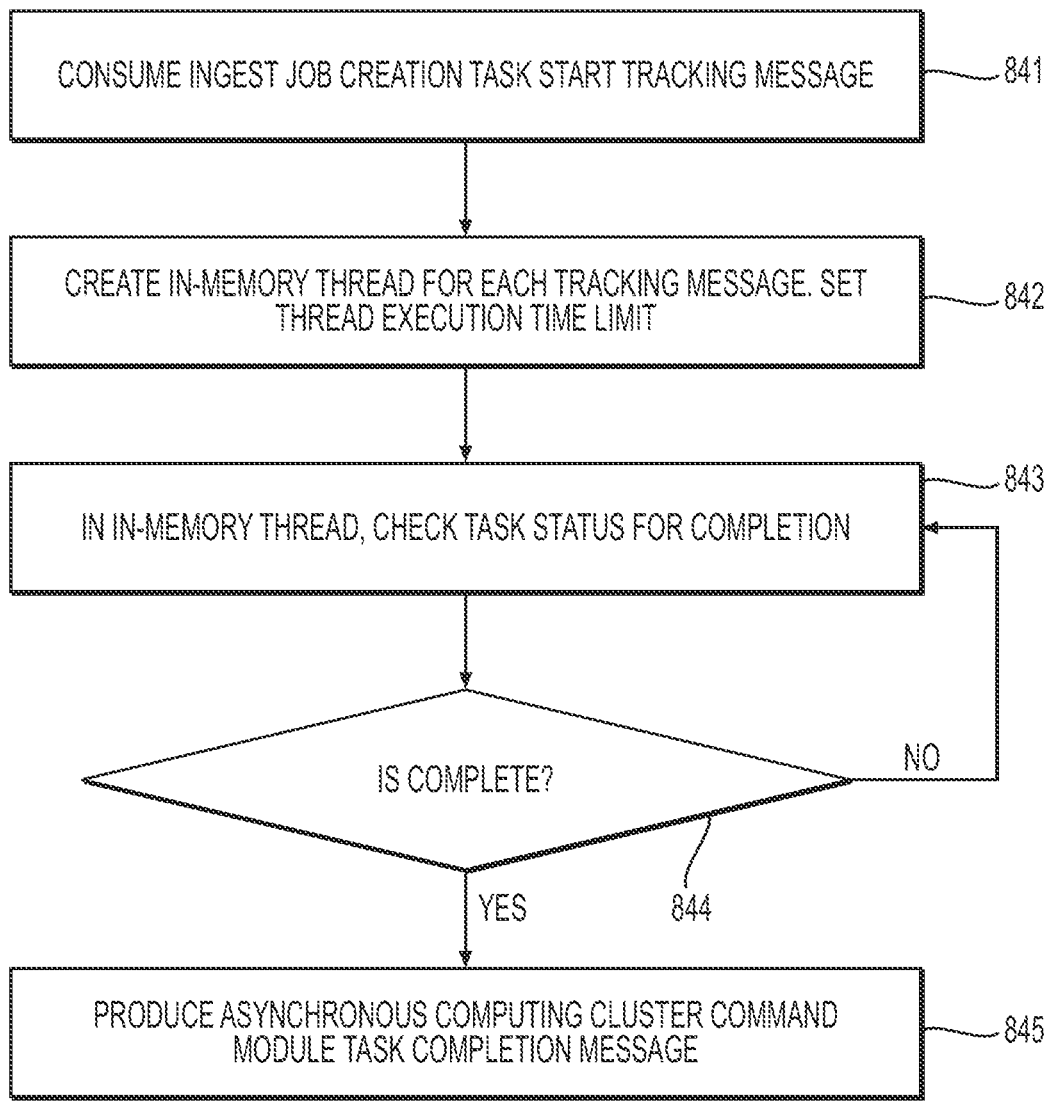

FIG. 8D shows processes of state service tracking component. The ingest job creation task start tracking message, which is produced in the process 823, is consumed, block 841. In-memory thread for each tracking message is created, and thread execution time limit is set, block 842. In the in-memory thread, task status is checked for completion, block 843. This checking status process continues until the task is completed, block 844. Once the task is completed, asynchronous computing cluster command module task completion message is produced, block 845.

Figure 8E:
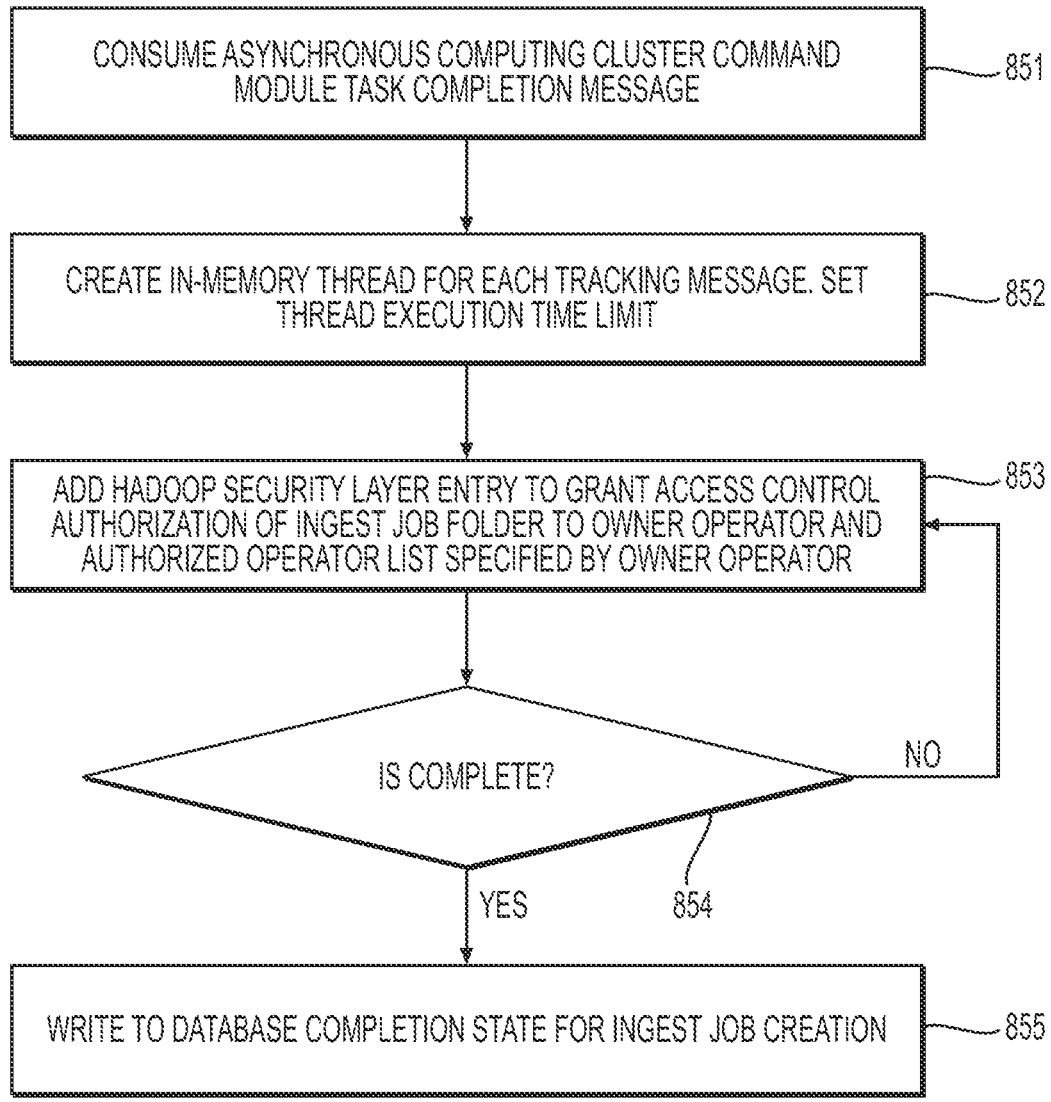

FIG. 8E shows processes performed by an ingest job component response handler. The asynchronous computing cluster command module task completion message, which is produced in the process 845, is consumed, block 851. In-memory thread for each tracking message is created, and thread execution time limit is set, block 852. Hadoop security layer entry is added to grant access control authorization of ingest job folder to owner operator and authorized operator list specified by owner operator, block 853. When the Hadoop security layer entry is completed, block 854, database completion state for ingest job creation is written, block 855. When the database completion state for ingest job creation is written, the wait step, block 811, shown in FIG. 8A ends, and the ingest job creation process is completed.

The embodiment may include one or more computing systems that include at least one processor and at least one computer readable medium. The computing systems are coupled to a network of distributed computing cluster. The processes for the creation of the ingest job agent as described above may be stored in a computer readable medium as computer executable instructions. The processor, which is coupled to the computer readable medium, may read the instructions and execute the computer executable instruction that causes the one or more computing systems to perform operations for the creation of ingest job agent for secure multitenant operations of a distributed computing cluster.

As described above, a series of asynchronous operations is performed for user onboarding process and for creating ingest job agents. Benefits of the asynchronous process (operation) include fault tolerance. For example, if any process described in steps shown in FIGS. 3A-3E and FIGS. 8A-8E fails due to execution interruption (e.g. if the computer system restarts due to power loss or other failure during execution of those steps), then the system will automatically repeat the process and continue processing once the system becomes available again and execution steps proceeds. The other benefits of the asynchronous process include scalability. Each step shown in FIGS. 3A-3E and FIGS. 8A-8E may run on different computers independently from other steps. A different number of computers may be used to run each step. The operating expense of the asynchronous processes therefore may be selected based on the number of users and the time it takes to execute each step.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method of creating an ingest job agent for secure multitenant operations of a distributed computing cluster, comprising:
   receiving a network service call from a client computer containing credentials of an operator, in which the client computer is located in a network security domain coupled to the distributed computing cluster;
   initiating the network service call to a centralized directory server, located in the network security domain, to authenticate the operator using the transmitted credentials;
   presenting a user interface to collect a plurality of ingest job agent configuration options from the operator;
   storing the ingest job agent configuration options to a data store in the centralized directory server;
   initiating a series of asynchronous operations to create the ingest job agent; and
   updating a metadata store in the distributed computing cluster to indicate to the operator that the creation of the ingest job agent is completed, wherein the series of asynchronous operations comprises:
   creating an ingest source folder in an ingest server where files shall be transferred from;
   creating an ingest sink folder on a distributed file system where files are transferred to;
   creating an access control list entry which grants and limits access of the ingest source folder and the ingest sink folder to the operator of the ingest job agent and other operators specified by the operator; and
   initiating an in-memory process which monitors and moves files an authorized operator deposits inside the ingest source folder into the ingest sink folder via network file transfer.

2. The method of claim 1, the series of asynchronous operations further comprises creating a shadow account on every node of the distributed computing cluster.

3. The method of claim 1, further comprising:
   producing ingest job creation task start tracking messages after the initiating a series of asynchronous operations for the creation of ingest job agent;
   creating an in-memory thread for each tracking message;
   setting a thread execution time limit;
   checking a task status for completion in the in-memory thread; and
   producing an asynchronous computing cluster command module task completion message.

4. The method of claim 3, further comprising:
   adding a security layer entry to grant an access control authorization of the ingest job folder to the operator; and
   writing to database completion state for the ingest job creation.

5. A non-transitory computer readable medium in a computing device that has a processor, the computing device coupled to a distributed computing cluster, the non-transitory computer readable medium having instructions for creating an ingest job agent for secure multitenant operations of a distributed computing cluster, the instructions causing the processor to perform operations comprising:
   receiving a network service call from a client computer containing credentials of an operator, in which the client computer is located in a network security domain coupled to the distributed computing cluster;
   initiating the network service call to a centralized directory server, located in the network security domain, to authenticate the operator using the transmitted credentials;
   presenting a user interface to collect a plurality of ingest job agent configuration options from the operator;
   storing the ingest job agent configuration options to a data store in the centralized directory server;
   initiating a series of asynchronous operations to create the ingest job agent; and
   updating a metadata store in the distributed computing cluster to indicate to the operator that the creation of the ingest job agent is completed, wherein the series of asynchronous operations comprises:
   creating an ingest source folder in an ingest server where files shall be transferred from;
   creating an ingest sink folder on a distributed file system where files are transferred to;
   creating an access control list entry which grants and limits access of the ingest source folder and the ingest sink folder to the operator of the ingest job agent and other operators specified by the operator; and
   initiating an in-memory process which monitors and moves files an authorized operator deposits inside the ingest source folder into the ingest sink folder via network file transfer.

6. The non-transitory computer readable medium of claim 5, the series of asynchronous operations further comprises creating a shadow account on every node of the distributed computing cluster.

7. The non-transitory computer readable medium of claim 5, the operations further comprising:
   producing ingest job creation task start tracking messages after the initiating a series of asynchronous operations for the creation of ingest job agent;
   creating an in-memory thread for each tracking message;
   setting a thread execution time limit;
   checking a task status for completion in the in-memory thread; and
   producing an asynchronous computing cluster command module task completion message.

8. The non-transitory computer readable medium of claim 7, the operations further comprising:
   adding a security layer entry to grant an access control authorization of the ingest job folder to the operator; and
   writing to database completion state for the ingest job creation.

9. The method of claim 1, further comprising collecting ingest job metadata and storing the ingest job metadata in the data store in the centralized directory server.

10. The non-transitory computer readable medium of claim 5, wherein the operations further comprise collecting ingest job metadata and storing the ingest job metadata in the data store in the centralized directory server.

* * * * *